Figures 3, 4, 5:
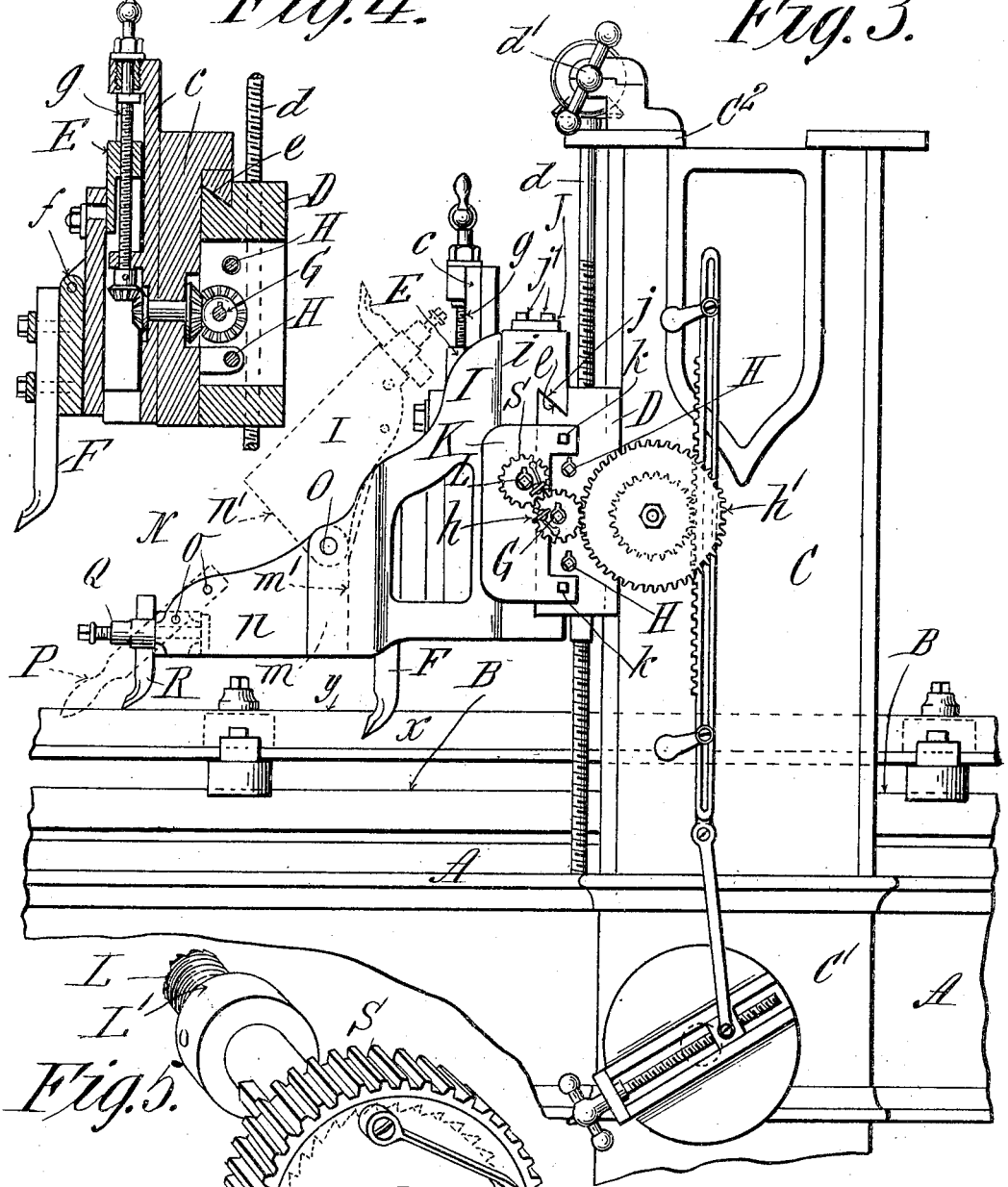

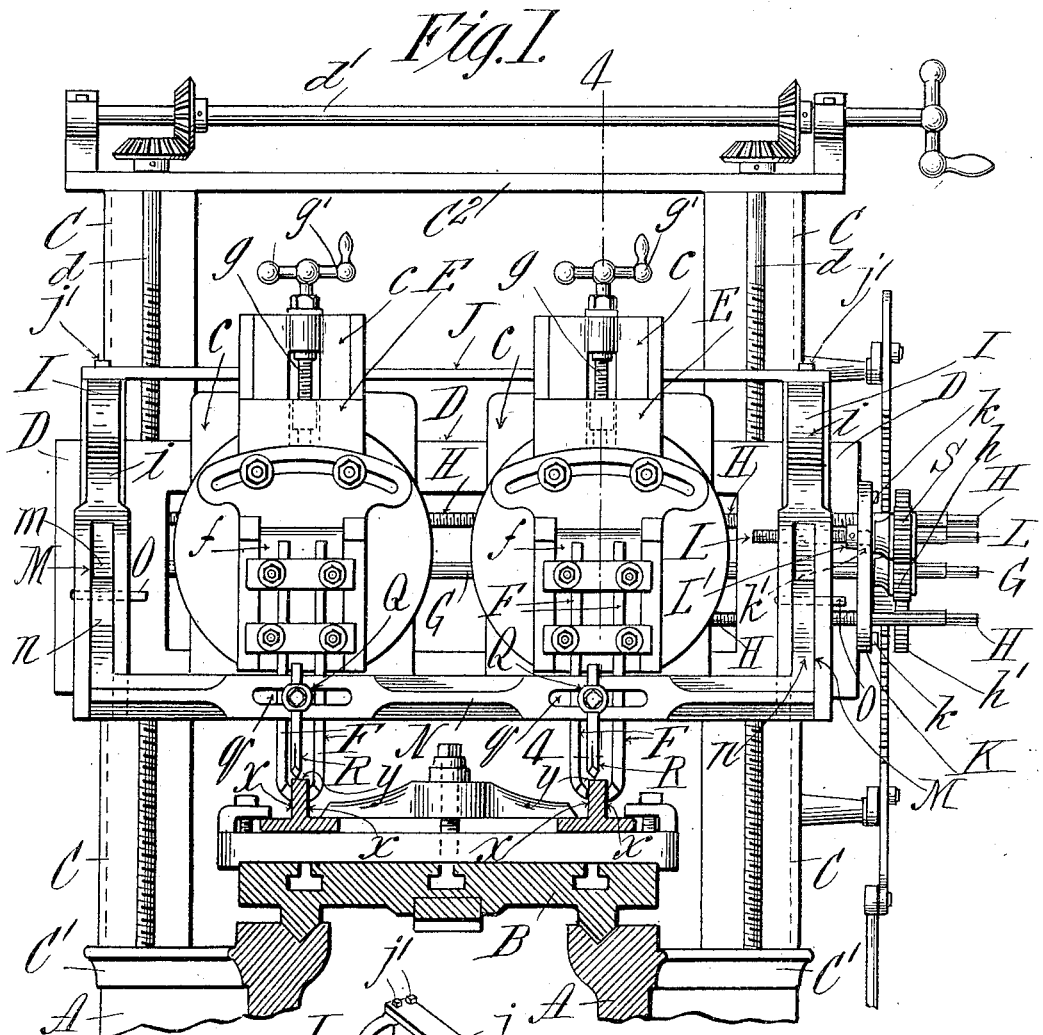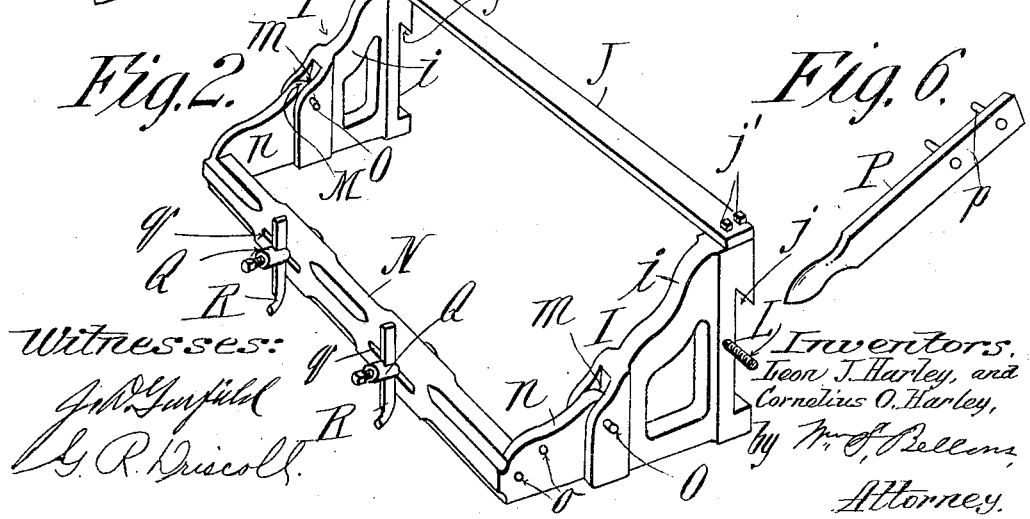

No. 807,740. PATENTED DEC. 19, 1905.
L. J. & C. O. HARLEY.
METAL PLANING MACHINE.
APPLICATION FILED JUNE 21, 1905.

2 SHEETS—SHEET 2.

Witnesses:
J. W. Garfield
G. R. Driscoll

Inventors,
Leon J. Harley, and
Cornelius O. Harley
by W. F. Bellows
Attorney.

UNITED STATES PATENT OFFICE.

LEON J. HARLEY AND CORNELIUS O. HARLEY, OF SPRINGFIELD, MASSACHUSETTS.

METAL-PLANING MACHINE.

No. 807,740.  Specification of Letters Patent.  Patented Dec. 19, 1905.

Application filed June 21, 1905. Serial No. 266,290.

*To all whom it may concern:*

Be it known that we, LEON J. HARLEY and CORNELIUS O. HARLEY, citizens of the United States of America, and residents of Springfield, in the county of Hampden and State of Massachusetts, have invented certain new and useful Improvements in Metal-Planing Machines, of which the following is a full, clear, and exact description.

This invention relates to metal-planing machines of a very common type in which is comprised a movable tool-carrying head which has combined therewith mechanism including interchangeable parts operable for imparting to the tool-carrying head either a horizontal cross-feed or a vertical feed, such planers as heretofore constructed and used being capable of planing at one time, according as the machine is set, either across a horizontal surface or across a vertical surface.

More especially the invention relates to improvements in a planing-machine in which there are comprised a tool-carrying head which is movable horizontally and transversely and a tool-carrying head which is movable vertically, and which machine includes a feed mechanism coöperative with both the movable heads, so that while one tool-carrying head will have feed movements vertically the other head will simultaneously have feed movements horizontally, whereby the machine is capable of planing on the upper horizontal surface and on a vertical surface or surfaces of a given piece of work at the same time, and so that the planing of pieces of work to be machined on sides at right angles to each other may be accomplished twice as rapidly as possible in machines having but one tool-carrying head and feed mechanism therefor.

Incidentally an aim of the invention is to impart to the machine the capabilities for the right-angular feedings of its tool-carrying heads by the provision of simple equipments or attachments and without a general reorganization of the planing-machine.

Another object is to provide the appliance comprising the head or support for the cross-feeding tool or tools of such construction that the part which directly carries the tools may be temporarily swung into a position which is free and clear of the head or heads, which latter in the present improved machine are used for holding the tools for the vertical plane-surfacing, whereby the support for the cross-fed tools forms no obstruction to the most convenient access to the heads for the other tools, which is desirable in positioning or replacing the latter.

The invention consists, in a metal-planing machine, of the combination, with the carriage or movable work-table, a vertically-feeding tool-carrier, and a horizontally-feeding tool-carrier, of a mechanism in common to and having motion transmitting connection with both the vertical and horizontally feeding tool-carriers and operable both to feed the first vertically and the second horizontally; and the invention, furthermore, consists in certain particular constructions and arrangement of parts, all substantially as hereinafter described, and set forth in the claims.

Proceeding now to describe our invention embodied in a planing-machine as we have constructed it, Figure 1 is an end elevation or face view of the standard and cross-slide of a planing-machine having mounted in working positions thereon the usual tool-carrying heads, and our improved tool-carrying frame, the work-table portion of the planer and duplicated pieces of work to be operated on being shown in vertical section as taken transversely through the planer-bed, work-table, and work. Fig. 2 is a perspective view of the tool-holding frame comprising a part of the present invention. Fig. 3 is a side elevation as taken at right angles to Fig. 1. Fig. 4 is a vertical section as taken on line 4 4, Fig. 1. Fig. 5 is a view of a ratchet and pawl comprised in the machine-tool-feeding devices and is shown, on a large scale, as combined with the screw-feed shaft for the transversely-movable tool-carrying frame; and Fig. 6 is a perspective view of a convenient form of lifting-handle for the hinged portion of said tool-frame.

In the drawings, A is the bed of a metal-planing machine of substantial lengthwise extent and has formed thereon the longitudinally-extending slideways for receiving the V-slides of the reciprocating work-table or carriage B.

The belt-driven mechanism embodying the usual rack-and-pinion work-table-propelling devices and the coacting work-table-reversing devices are not shown, except such parts thereof as relate directly to the actuating devices for the tool-feeding mechanism.

About midway of the length of the bed A are the standards C C, which are supported on the side extension C' of the bed. The top portion of these standards are united by the shelf-bar C². Suitably guided in these standards C and extending transversely across the planer above the traveling work-table B thereof is the girder or large cross-bar D. Vertical screw-shafts $d$, engaging the end portions of the cross-bar, are revolubly supported by each of the standards C and have bevel-gear connections with a horizontal crank-provided shaft $d'$, by means of which the cross-bar D and the tool-carrying heads mounted thereon are adjusted vertically. The cross-bar D has an integral dovetail slide-rib $e$ formed adjacent its upper edge, on which are mounted the saddles $c$ of the swivel-heads E.

The tool-carrying hinged apron $f$, to which are clamped the cutting-tools F, has suitable vertical adjustments relative to the saddle $c$ and the screws $g$, operated by the hand-cranks $g'$, position the heads so that the tools to be fed vertically will be initially at their proper heights. This same screw $g$, which has a bevel-gear connection, as shown in Fig. 4, with the automatically-rotated spline-shaft G, is also employed as a vertical-feeding means for the tools F.

The foregoing is a brief reference to the planer parts relating to the vertically-fed cutting-tools F, as are common and well known, and by a reference to Fig. 1 it is apparent that by employing a plurality of cutting-tools, as here illustrated, beginning at the top edges, two or more pieces of work, such as the T-rails shown, may be simultaneously planed on their side portions $x$.

The parts comprised in the cross-feed tool-carrying frame consist of two oppositely-located frames or brackets I I, each having slideways $j\,j$ for engagement with the slide-rib $e$ of the cross-bar D. These side frames or brackets are rigidly held in proper relation to each other by the uniting top bar J, which is secured thereto by the screw-bolts $j'$. A thrust-plate K is next attached to one end of the cross-bar D by bolts $k\,k$ and supports in a perforation $k'$ therein the short screw-threaded cross-feed shaft L. This feed-shaft L has a screw engagement with one side frame I of the transversely-movable tool-carrying frame, as shown in Fig. 1. A thrust-collar L' is pinned to said shaft L and bears against the thrust-plate K. The front edge portions M of the side frames I are recessed at $m$ and receive therein the side pieces $n$ of the pivoted carrying tool bar or head N. This tool-bar N, as seen best in Figs. 2 and 3, is pivotally attached to the side frames by the pins O, which pass through the side pieces $n$ thereof, the straight sides $n'$ of which bear against the straight back wall $m'$ of recess $m$, thereby maintaining the tool-bar N in a working position, as shown in full lines in Fig. 3, or, as shown in dotted lines in said figure, the tool-bar N may be swung upwardly on its pivot O to a position entirely removed from the position on the work-table of a piece of work. This latter capability of the tool-bar N is of great convenience during the operation of clamping the work to its position on and while removing the same from the work-table, and it also leaves the space in front of the vertically-feeding tools unobstructed, so that such tools may be clamped in place or removed or interchanged without difficulty.

A handle-bar P, (see Fig. 6,) having pins $p$ thereon, which are adapted to engage the holes $o$ in the side pieces $n$ of the tool-bar, forms a convenient means for swinging the somewhat heavy fixture comprised in the cross-feeding appliances from one position to another.

The tool-bar N has provided thereon the tool-holding slotways $q$, (see Figs. 1 and 2,) which receive in their proper initial adjustments the tool-posts Q, on which are adjusted and secured the tools R for horizontal surface-planing. These slotways, which are approximately in positions on the bar N over the work to be planed, are long enough in horizontal extent for the proper range of lateral adjustments of the tools to be used.

At each reciprocation of the carriage the pinion $h$ has a rotational movement, which motion is likewise given to the shaft G, which, through the usual bevel-gear connections (shown in Fig. 4) between shaft G and the feed-screw $g$, gives the motion to the vertical-feeding tool-carrying head E, (or pair thereof.) Now the same pinion gear-wheel $h$ which actuates through the ordinary connections the feed-screw shaft $g$ by meshing into and rotating the pinion gear-wheel S simultaneously turns the short feed-screw shaft L, which by its engagement with the part I, comprised in the carrier for the tools R R, horizontally feeds the latter, it thus appearing that while the tools F F are fed down the tools R R are fed crosswise as the planing on the sides and top of the work progresses.

By having the bar N and side members $n\,n$ pivotally mounted on the frame members I I so as to yield in one direction only the tools R R are free to give as the carriage or work-table has its backward run, whereby the points of such tools in proximity to the reversely-moving work may not be injured.

We claim—

1. In a metal-planing machine, the combination with the carriage and the stationary elevated cross-bar D, of a vertically-feeding tool-carrier supported intermediately on said cross-bar and a structure comprising side frames or brackets slidably engaged with the end portions of said cross-bar, the transversely-arranged tool-carrying bar or head N having at the ends thereof the angular members $n\,n$ pivotally engaged with said bracket-frames, of a mechanism in common to, and having motion-imparting connection with, both the vertically-feeding tool-carrier and said horizontally-slidable structure.

2. In a metal-planing machine, in combination, the carriage and the cross-bar D normally stationary and vertically adjustable, a saddle or slide c movable horizontally on said cross-bar, a tool-carrying head vertically slidable on said saddle, and a vertical feed-screw in engagement therewith, the side bracket-frames I I slidable on the end portions of said cross-bar and having the members n n pivotally jointed thereto and carrying the uniting tool-carrying head-bar N, the horizontally-arranged shaft G having the gear-wheel h affixed thereon, shaft and bevel-gear connections between said horizontal shaft and the vertical feed-screw shaft, a horizontally-arranged screw-shaft L, in feeding engagement with one of said side bracket-frames, the gear-wheel S affixed on said feed-shaft L, and in mesh with the said gear-wheel h and means for imparting rotary movements to said intermeshing gears.

3. In a metal-planing machine, in combination, the carriage and the elevated cross-bar D normally stationary and vertically adjustable, and means for vertically adjusting it, a plurality of saddles or slides c movable horizontally on said cross-bar, and adjusting screw-shafts H H therefor, tool-carrying heads vertically slidable on each of said saddles, and screw-shafts g in engagement therewith, vertically arranged and for imparting a vertical feed movement to said tool-carrying heads, the side bracket-frames I I slidable on the end portions of said cross-bar having the transverse uniting-bar J, and having the members n n pivotally jointed thereto and carrying the horizontal and transversely uniting tool-carrying head-bar N, the spline-shaft G having the gear-wheel h affixed on the outer end thereof and shaft and bevel-gear between, and spline engaged with said shaft G and each vertical feed-screw shaft g, a horizontally-arranged feed-screw shaft L, in feeding engagement with one of said side bracket-frames I, the gear-wheel S affixed on said feed-shaft L, and in mesh with the said gear-wheel h, and means for imparting rotary movements to said intermeshing gear-wheels h and S.

Signed by us at Springfield, Massachusetts, in presence of two subscribing witnesses.

LEON J. HARLEY.
CORNELIUS O. HARLEY.

Witnesses:
WM. S. BELLOWS,
G. R. DRISCOLL.